H. CORY.
FRICTION LINING FOR BRAKES AND CLUTCHES.
APPLICATION FILED MAY 5, 1917.
1,286,171.
Patented Nov. 26, 1918.
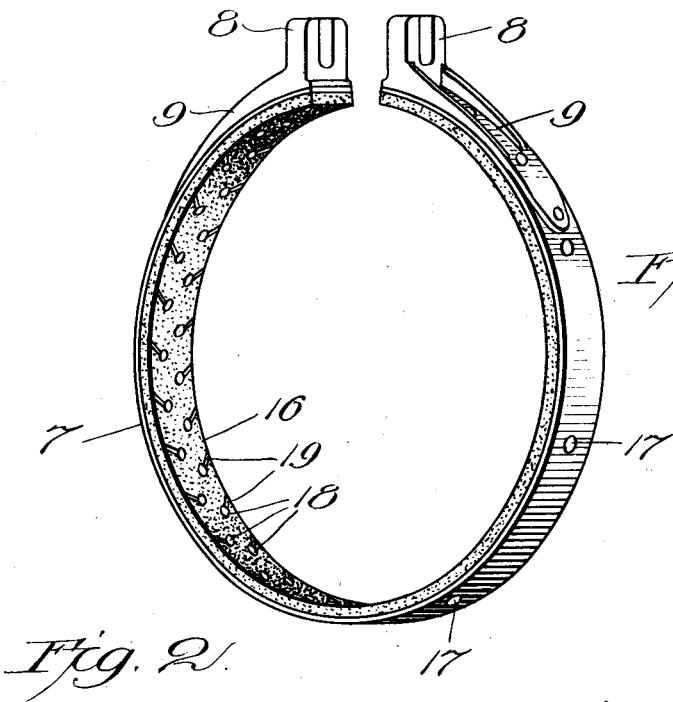
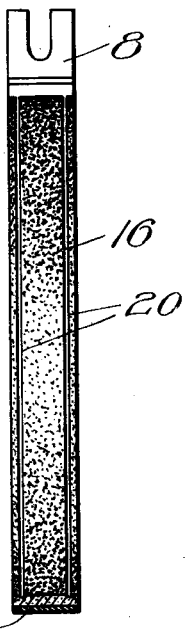
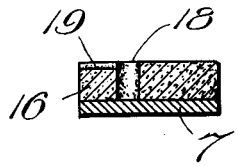
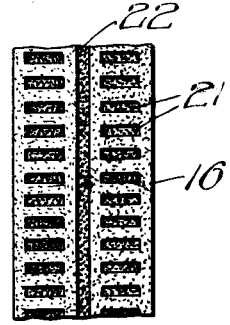
Witness: Harry S. Gaither
Inventor: Harvey Cory
by Banning & Banning Attys

UNITED STATES PATENT OFFICE.

HARVEY CORY, OF CHICAGO, ILLINOIS, ASSIGNOR TO THOMAS L. WILKINSON, OF MASONTOWN, PENNSYLVANIA.

FRICTION-LINING FOR BRAKES AND CLUTCHES.

1,286,171.   Specification of Letters Patent.   Patented Nov. 26, 1918.

Application filed May 5, 1917. Serial No. 166,549.

*To all whom it may concern:*

Be it known that I, HARVEY CORY, a citizen of the United States, residing at Chicago, in the county of Cook and State of Illinois, have invented certain new and useful Improvements in Friction-Linings for Brakes and Clutches, of which the following is a specification.

In the making of linings for brakes and clutches, it has been found that cork or a composition of cork is superior to almost every other material in its frictional gripping properties, in that it does not become slippery when oil is applied thereto, which is a defect characteristic of certain materials the frictional properties of which are decreased or impaired if subjected to oil or the like.

Cork or a composition thereof, if employed in an unoiled condition, tends to burn out and disintegrate when subjected to the high degree of heat incident to use; and the object of the present invention is to overcome this difficulty in order that the highly desirable frictional properties of cork or a composition thereof may be utilized. For this purpose the lining of the present invention is provided with cells or pockets adapted to retain small quantities of oil, which subserve a cooling function without impairing the frictional properties of the cork itself, thereby overcoming the difficulty which has heretofore been experienced due to a burning out of the lining.

The invention consists in the features of construction and combinations of parts hereinafter described and claimed.

In the drawings:

Figure 1 shows a brake or clutch band in the form of a split ring, having the lining of the present invention in its preferred form applied thereto;

Fig. 2 is a section taken through a clutch band of the character shown in Fig 1, showing a modified lining applied thereto;

Fig. 3 is an enlarged cross sectional detail of the lining of Fig 1; and

Fig. 4 shows a modified form of lining.

The lining of the present invention is shown as applied to a clutch comprising a band 7 in the form of a split ring, which band is provided at or near the split therein with a pair of upstanding slotted lugs 8 8, each of which is provided with a foot 9 which is bolted or otherwise secured to the band. These parts of the band are intended to coöperate with other elements, not shown, for setting the clutch against a drum or the like when friction is to be applied thereto, and are not in any way essential to the present invention.

The band 7 is provided with an inner lining 16 which is preferably formed of a strip of cork or of a composition employing cork as the base, which lining is attached to the band by means of a series of rivets 17 or the like. The band, as shown, is provided on its acting face with cuts or depressions 18 which may be of varying form. As shown in Fig. 1, the cuts or depressions are in the form of small pockets formed in the face of the lining, and each of the pockets has extending therefrom a short diagonal groove or channel 19 which extends in an upward and outward direction and serves to afford communication between the pocket 18 and the adjacent outer edge of the lining strip.

In place of the pockets 18, one or more continuously extending channels 20 may be provided, as shown in Fig. 2. In Fig. 4 is shown a still further modification in which a series of rectangular pockets 21 are provided, which, if desired, may be associated with a central channel 22 extending circumferentially of the lining strip.

Channels or depressions of still other forms may be employed, and it will be understood that the invention in its more general aspects is not limited to the precise form, shape and arrangement of the grooves, pockets or channels, which latter may be varied almost indefinitely without departing from the spirit of the invention, which consists essentially in the provision of cups or pockets in the acting surface of the lining strip, so arranged as to house small quantities of oil for the purpose of cooling the strip and preventing its burning out under the heat produced by friction.

The arrangement of the cups or pockets shown in Fig. 1 is particularly desirable, in that the short diagonal channels assist in the accumulation of oil, but this particular arrangement is not deemed essential in all cases, since continuous channels or pockets of other formation will subserve a similar purpose in most cases.

By employing a lining of the character set forth, the frictional properties of cork may be utilized without danger of burning the lining, which has heretofore attended the employment of this material for similar purposes. The nature of cork is such that it will never wear smooth or hard when subjected to the action of oil, but will always retain the soft flexible properties which make it an ideal lining for clutching purposes.

It will, of course, be understood that the lining of the present invention may be used either in brakes or clutches, and that it is not intended to limit the invention to the use of such lining in connection with brakes or clutches employing split bands of the character shown, since other adaptations of the present invention are in contemplation.

Although cork or a composition thereof is an ideal material from which to make linings embodying the structural features of the present invention, nevertheless, the same arrangement of pockets or recesses may be applied to linings of other materials having corklike properties in greater or less degree, so that the claims, unless specifically limited to cork or a composition thereof, will be understood to cover and include other materials or compositions having corklike properties.

I claim:

1. A friction lining of cork-like material arranged for engagement with the under and opposite sides of a rotating element, the lining as well as the element being housed within an oil reservoir, the friction lining having in its acting face a plurality of pockets each adapted to retain a quantity of oil, there being a communicating passage extending from each pocket through to the edge of the lining, those passages along the sides of the rotating element being upwardly inclined to facilitate entrance of oil thereinto, substantially as described.

2. A friction lining of corklike material, having pockets or recesses in its acting face for the retention of oil, each of the pockets or recesses having an outwardly extending short channel cutting through the edge of the lining to permit the ingress of oil to the associated pocket, substantially as described.

3. A friction lining of corklike material, having pockets or recesses in its acting face for the retention of oil, each of the pockets or recesses having an outwardly and obliquely extending short channel cutting through the edge of the lining to permit the ingress of oil to the associated pocket, substantially as described.

4. A friction lining having cork as its frictional element, and having pockets or recesses in its acting face for the retention of oil, each of the pockets or recesses having an outwardly extending short channel cutting through the edge of the lining to permit the ingress of oil to the associated pocket, substantially as described.

5. A friction lining having cork as its frictional element, and having pockets or recesses in its acting face for the retention of oil, each of the pockets or recesses having an outwardly and obliquely extending short channel cutting through the edge of the lining to permit the ingress of oil to the associated pocket, substantially as described.

HARVEY CORY.